June 18, 1929.　　　　　K. SCHLEIFF　　　　　1,717,855
SHOCK ABSORBER, ESPECIALLY FOR MOTOR VEHICLES
Filed Jan. 6, 1928　　　2 Sheets-Sheet 1

Inventor:
Karl Schleiff
By
Attorney

June 18, 1929.  K. SCHLEIFF  1,717,855
SHOCK ABSORBER, ESPECIALLY FOR MOTOR VEHICLES
Filed Jan. 6, 1928   2 Sheets-Sheet 2
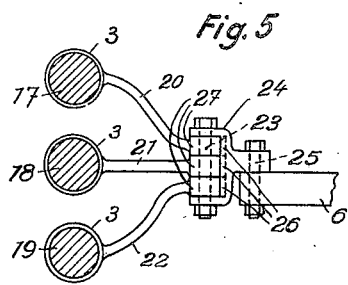
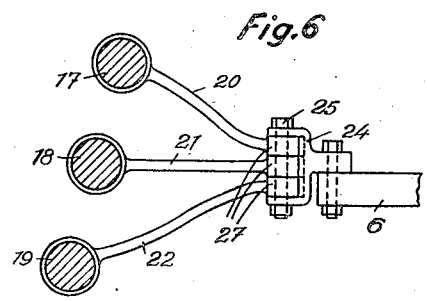
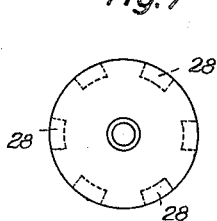
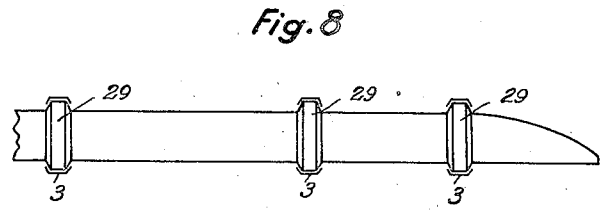
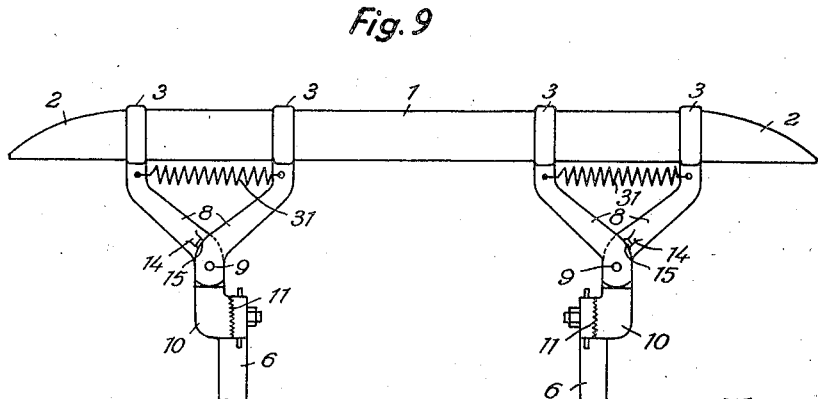
Inventor:
Karl Schleiff
By
Attorney.

Patented June 18, 1929.

1,717,855

UNITED STATES PATENT OFFICE.

KARL SCHLEIFF, OF BERLIN, GERMANY.

SHOCK ABSORBER, ESPECIALLY FOR MOTOR VEHICLES.

Application filed January 6, 1928, Serial No. 245,004, and in Germany November 26, 1924.

The present invention relates to a device for absorbing or damping the shock which a motor car or the like receives when striking violently against some obstacle and the essential feature of the invention is this, that the shock, that is, the energy of motion of the motor car, on account of the great working power of the same is substantially mechanically absorbed, so that the shock is almost completely braked off.

In the known shock absorbers or shock catchers, which are arranged at the front of the vehicle frame the resiliency of the steel material is utilized. Such shock absorbers have not however the ability in the case of a collision or the like to damp the shock, but are for a moment bent out of shape and thereupon transmit the shock with full force to the car proper or some adjacent parts of the same. Hereby the car or the shock catcher is severely strained and even damaged. This is due to the fact that the working power of the known shock catchers or guards is so small, that it in case of a collision only is able to counteract or brake a very small part of the energy of the motion of the car.

The improved shock absorbing device according to the present invention takes up any shock softly and elastically, whereupon a successively increasing loading or straining of the device takes place, which substantially or completely absorbs the energy of motion of the car, and assisted by the wheel brakes effects the stoppage of the same.

According to the invention the device consists of an expansible nonmetallic structure, preferably one or more rods of solid caoutchouc without any linings, insertions or the like of other or lesser expansibility. The employment of a caoutchouc rod is advantageous, because not only the great elastic flexibility of this material, but also the extremely high ductibility of the same can be utilized for initially absorbing the shock softly and elastically and thereupon for annihilating the shock by means of the successively increasing working power of the rod arising through the bending and longitudinal stretching of the caoutchouc. The rod should preferably be of a relatively great sectional area, wherefore the same should be of solid material.

According to the invention caoutchouc rod is fixed or clamped in such a manner, that the fixing or clamping points of the same are deflected or shifted when the rod is struck and simultaneously with the shifting of the clamping points a very great longitudinal stretching of the rod takes place.

In order to further increase the working power made useful in the above mentioned way the rod may be fixed or clamped in more than two places in such a manner, that the fixing points, under the influence of the shock, will move and each rod section between two fixing points simultaneously, independent of the other rod sections will be subjected to a longitudinal stretching. Hereby the working power of the rod may be multiplied.

The caoutchouc rod and its fastening points possess the advantage, that any shock which is received at the fastening points or between the same will be absorbed completely elastically, because at each point of the rod an elastic deflection and an elastic longitudinal stretching take place. The same favorable effect is obtained when the entire rod or a plurality of fastening points simultaneously receive a shock, because also in such cases a bending and a great longitudinal stretching of the rod take place.

It is of essential importance, that the chosen caoutchouc material can be stretched longitudinally to an extraordinary degree without losing its elasticity. With other materials the elastic limit, that is, the limit of proportional extension is surpassed already at substantially lesser longitudinal stretchings, so that the material is rent. Experiments have also shown that caoutchouc safely can be loaded with a relatively great tensile force per cross sectional unit.

Some constructional forms of the invention are shown by way of examples in the accompanying drawings.

Figs. 5 and 6 are sectional views of a device consisting of a plurality of shock absorbing rods.

Fig. 7 is an end view showing a fastening means for the shock absorbing rods.

Fig. 8 is a top view showing a further constructional form of the invention.

Fig. 9 is a top view showing still another form of the same.

Figure 1:
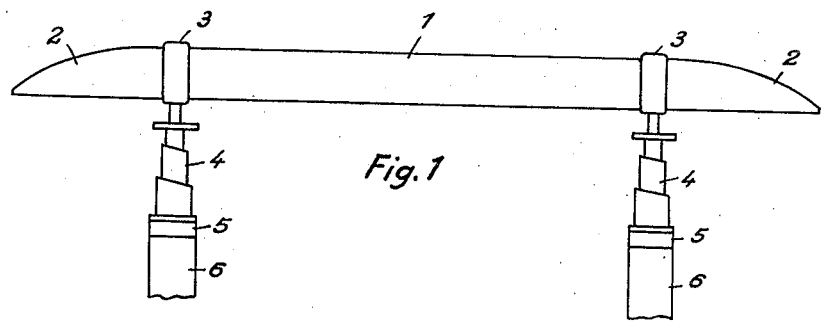
Fig. 1 is a top view showing a simple constructional form of the invention.

According to Fig. 1 the device consists of a rod 1 of a suitable nonmetallic elastic material such as caoutchouc. The rod is formed with tapered ends 2 and is preferably not hollow but solid. The rod is fastened in two clips or brackets 3, which by means of springs 4 and sleeves 5 or the like are fixed on the car frame, for instance on the frame members 6.

Figure 2:
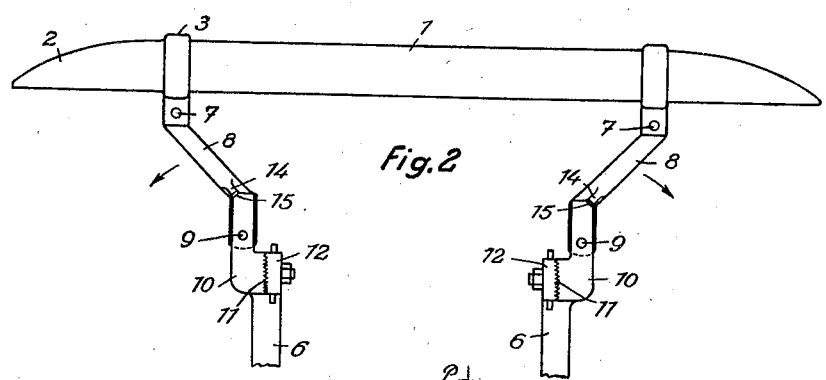
Fig. 2 is a top view showing another form of a shock absorber according to the invention, having two fastening points.

In the arrangement shown in Fig. 2 the ends of the caoutchouc rod 1 are arranged in clips or clamps 3, which by means of screws 7 are fastened to the outer ends of arms 8, the inner ends of which at 9 are pivotally connected to supports 10. These supports can by means of the toothed faces 11 be adjusted in different heights on the carrier bodies 12, which are fixed on the frame members 6 or on other suitable parts of the car.

Figure 3:
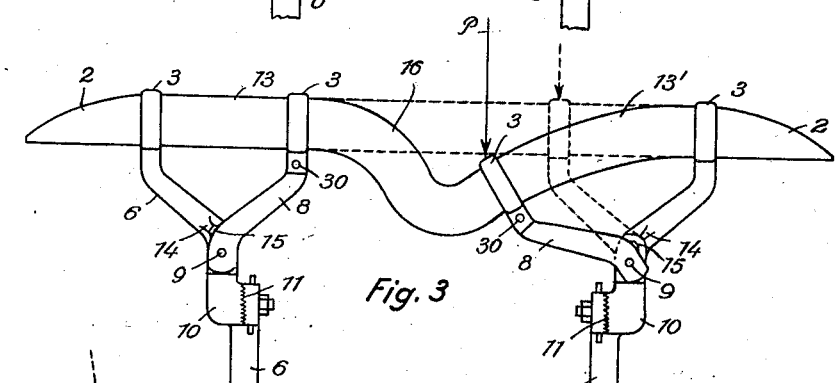
Fig. 3 is a top view illustrating the deformation created by a shock applied to a device according to the invention which is fastened in a plurality of places.
Figure 4:
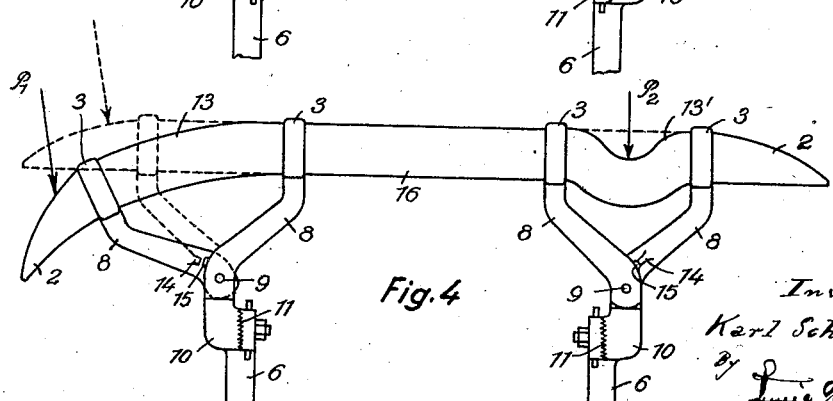
Fig. 4 is a top view illustrating the device of Fig. 3 subjected to several shocks.

The form of the invention shown in the Figs. 3 and 4 differentiates from the form shown in Fig. 2 in that the rod 1 is not only fastened or embraced at both ends, but also intermediate the ends. The sections 13 and 13′ of the rod are each fastened in two clips 3, the carrier arms 8 which are in pairs and are arranged with joints 9.

The arms 8 are by means of the members 10, and the bodies 11 connected to the ends of the frame members 6 or to other suitable parts of the car.

The Figs. 3 and 4 illustrate the deformation of the rod 1 under the action of shocks which strike the same in different points. According to Fig. 3 the shock is directed against the inner clip of the clip pair 3. The arms 8 are according to the invention equipped with projections 14, which engage stops 15 on the bodies 10 in such a manner, that the outer arms only can be deflected outwards and the inner arms inward. An inwardly directed movement of the outer arms, or an outwardly directed movement of the inner arms is thus prevented by the projections 14 and the stops 15. If, as shown in Fig. 3 a force P strikes against one of the clips, the corresponding clip arm is deflected to the left. Simultaneously the rod section 16 between the inner clips is bent in the direction of the shock and the adjacent rod section 13′ between the right hand clip pair 3 is severely stretched in longitudinal direction. On account of the work done in bending and stretching, the energy of the shock that is, the working energy contained in the same is absorbed.

According to Fig. 4 a shock force $P_1$ acts upon the left end of the rod 1 and a further shock force $P_2$ acts upon the section 13′ between the right hand clip pair 3. The force $P_1$ moves the end of the rod and the adjacent arm 8 in the direction of the shock, whereby the section 13 is strongly stretched in longitudinal direction. The force $P_2$ effects a bending and also a longitudinal stretching of the other section 13 of the rod, whereby an outward deflection of the arms 8 can not take place, because the force is directed against the middle point of the joint 9. The working power which is developed in the rod on account of the stretching and bending of the sections 16 and 13′ (Fig. 3), that is, the bending and stretching of the sections 13 and 13′ (Fig. 4) will become effective and absorb the live energy of the shock. In the case of a collision the brakes of the car will of course also be operated, and thereby assist in reducing the speed and damping the shock.

The shock absorbing device shown in Fig. 5 consists of three rods 17, 18, 19 arranged above one another. The rods are by means of clips or straps 3 connected to the arms 20, 21, and 22, which are arranged substantially in the manner shown in Figs. 3 and 4. The corresponding arms 20, 21, and 22 on the right and left sides respectively may be arranged on a common bearing or joint pin 23 located in the body 24, which in a suitable manner, for instance by means of a toothed face or the like and a screw 25 is fastened to the frame member 6. Adjacent the bearing or joint pin the arms are equipped with projections 26, which in the manner of the projections 14 (Fig. 3) allow only a deflection of the arms in a single direction. The arms 20, 21, and 22 may move independently of each other or the same may in a sense be coupled to each other in the manner shown in Fig. 7. According to this figure the bosses 27 of the arms are equipped with projections, which engage correspondingly formed slots in the adjacent arms. The arrangement may be such, that at first only the rod subjected to the shock is deformed. At a certain grade of deflection of an arm 20, 21 or 22 however, the adjacent arm may become coupled to the first mentioned one, whereby the second rod is forced to undergo the bending and stretching movement and thereby is coupled to the third rod, which in similar manner undergoes stretching and absorption of the force of the shock. Hereby the working power of all rods is utilized and the initial shock is taken up softly and elastically.

The arms 20, 21, and 22 may of course also from the beginning be coupled to each other in such a manner, that the movement of one arm effects the movement of the adjacent arm respectively of all arms and rods. In this way also the rods which are not directly struck by the shock will partake in damping the same from the moment at which the shock occurs.

As shown in Fig. 6 the rods 17, 18, and 19 may also be arranged in different vertical planes, so that they successively are hit by or contact with an obstacle with which the car collides.

The arrangement shown in Fig. 6 is especially advantageous in case a person should be hit by a car. In this case the person will first be hit by the lowermost rod 19, which is lying in front of the other rods. The person will now fall with part of the body in a direction opposite to the direction in which the car is moving and may thereby easily catch one of the upper rods 17 or 18, or both.

The arrangements shown in the Figs. 5 and 6 are further advantageous because the working power of the shock absorber may be essentially increased by employing a plurality of rods with normalized dimensions. In such case, for instance for freight cars, the shock is initially taken up softly and elastically, in spite of the raised working power of the device and later on the working power successively becomes effective with increasing force until all rods are operating.

According to Fig. 8 the rods are equipped with flanges or beads 29, which facilitate the fastening of the braces or clips 3. Simultaneously the sliding of the clips on the rods is prevented even during heavy stresses.

It may in certain cases be advantageous to arrange the inner clips of Fig. 3 in such a manner that the same to a certain degree can be displaced in relation to the inner arms 8. This can be effected by arranging the clips on pivots 30. The clips will according to this arrangement under all conditions adjust themselves in such a manner relatively to the rod, that a damaging of the latter is out of question.

It will be evident that with the arrangements shown in Figs. 3 and 4 also a frontal shock or a shock which simultaneously hits all clips will be softly and elastically taken up. In such case the outer arms will be deflected in outward direction and the inner arms in an inward direction, whereby all sections between the ends of the rods are stretched longitudinally.

More than four clamping or fastening points may be arranged and springs may be employed for assisting the arms 8 and raising the working power of the device. As shown in Fig. 9 a spring 31 or the like may for instance be arranged between the arms, which spring is placed under tension when the arms are deflected.

A further essential feature of the invention is, that any shock, independently of the point in which it strikes, is softly and elastically taken up and that the device always automatically returns to its initial position, in spite of its great working power and the extraordinary deformations to which it is subjected. The shocks even the hardest ones are not able to bring forth any decrease in the usefulness of the device.

The invention is of course especially adapted for use in connection with motor cars, such as automobiles and the like. The same can however also be used on other crafts used for carrying passengers or freight in order to prevent losses of human beings or materials in the case of a collision. The shock absorber may for instance be mounted in the bow of ferry boats and may in such case simultaneously act as a substitute of the usual bow fender.

I claim:

1. A shock absorbing device, especially for motor vehicles and the like, comprising in combination, a rod shaped solid caoutchouc body, pairs of clasp like holding means for said body, support arms for each of said clasps, elements on each of the arms belonging to a pair for preventing an inward movement of the outer arm and an outward movement of the inner arm during the deflection due to a shock and means for connecting said arms to said vehicle.

2. A shock absorbing device, especially for motor vehicles, comprising in combination, a rod shaped solid caoutchouc body, pairs of clasp like holding means for said body support arms for each of said clasps, elements on each of the arms belonging to a pair for preventing an inward movement of the outer arm and an outward movement of the inner arm during the deflection due to a shock, means for connecting said arms to said vehicle and pivotal connections between said means and said arms.

3. A shock absorbing device, especially for motor vehicles, comprising in combination, a rod shaped solid caoutchouc body, clamp like holding means for said body, arms rigidly connected to said clamp like holding means, bearers for connecting said arms to the vehicle, pivotal connections between said arms and said bearers and means for adjusting said bearers in different angular positions relatively to a horizontal plane.

4. A shock absorbing device, especially for motor vehicles, comprising in combination, a substantially rod shaped solid caoutchouc body having circumferential beads formed therein and means adapted to embrace such beads and connect said rod to the said vehicle.

5. A shock absorbing device, especially for motor vehicles, comprising in combination, a plurality of substantially rod shaped solid caoutchouc bodies arranged parallel to each other in different vertical planes and means for holding said rods connecting the same to the said vehicle.

6. A shock absorbing device, especially for motor vehicles, comprising in combination, a rod shaped solid caoutchouc body, clamp like holding means for said body, arms connected to said clamp like holding means, a spring connection between said arms, bearers for connecting said arms to the vehicle, pivotal connections between said arms and said bearers and means for adjusting said bearers in different angular positions relatively to a horizontal plane.

7. A shock absorbing device, especially for motor vehicles, comprising in combination, a plurality of substantially rod shaped solid caoutchouc bodies arranged parallel to each other, clamp like holding means for said rods, arms rigidly connected to said like holding means, bearers for connecting said arms to the vehicle, corresponding arms belonging to said different rods being pivoted to a common pin, means for coupling said corresponding arms in certain positions of their movement.

8. A device for absorbing the kinetic energy of a moving body colliding against an obstacle, comprising an impact member of high elasticity for tension; and means for fastening said member to the moving body so that the forces which are exerted during a collision will subject the said member to a strong longitudinal stretching.

9. A device for absorbing the kinetic energy of a moving body colliding against an obstacle, comprising a caoutchouc rod; and means for fastening said rod to the body so that the forces which are exerted during a collision will subject the member to a strong longitudinal stretching.

10. A device for absorbing the kinetic energy of a moving body colliding against an obstacle, comprising a caoutchouc rod; helical springs cooperating with said rod; and means for connecting the rod and the springs to the moving body so that said rod as well as the springs during a collision are subjected to a strong longitudinal stretching, whereby the kinetic energy of the moving body is absorbed.

11. A device for absorbing the kinetic energy of a moving body colliding against an obstacle, comprising a member of high elasticity for tension; a plurality of support arms for said member; and pivotal connections between said support arms and the moving body adapted to permit movement of said arms only in a single predetermined direction.

12. A device for absorbing the kinetic energy of a moving body colliding against an obstacle, comprising a member of high elasticity for tension; a plurality of support arms for said member; and pivotal connections between said support arms and the moving body adapted to permit said arms to move in opposite directions.

13. A shock absorbing device, especially for motor vehicles and the like, comprising a rod-shaped solid caoutchouc body; pairs of clasps acting as holding means for said body; support arms for each of said clasps; elements on each pair of arms for preventing an inward movement of the outer arm and an outward movement of the inner arm during a deflection of the body, due to a shock; and means for connecting said arms to said vehicle.

14. A shock absorbing device, especially for motor vehicles and the like, comprising a rod-shaped solid caoutchouc body; pairs of clasp-like holding means for said body; support arms for each of said clasps, each of said clasps being pivoted on its support arm; elements on each pair of arms for preventing an inward movement of the outer arm and an outward movement of the inner arm during a deflection due to a shock; and means for connecting said arms to said vehicle.

15. A shock absorbing device, especially for motor vehicles, comprising a rod-shaped solid caoutchouc body; pairs of clasp-like holding means for said body; support arms for each of said clasps; elements on each pair of arms belonging to a pair for preventing an inward movement of the outer arm and an outward movement of the inner arm during a deflection due to a shock; means for connecting said arms to said vehicle; and pivotal connections between said means and said arms.

16. A shock absorbing device, especially for motor vehicles, comprising a rod-shaped solid caoutchouc body; clamp-like holding means for said body; arms rigidly connected to said clamp-like holding means; bearers for connecting said arms to the vehicle; pivotal connections between said arms and said bearers; and means for adjusting said bearers in different angular positions relatively to a horizontal plane.

17. A shock absorbing device, especially for motor vehicles, comprising a substantially rod-shaped solid caoutchouc body having circumferential beads formed thereon; and means adapted to embrace said beads and to connect said rod to the said vehicle.

18. A device for absorbing the kinetic energy of a moving body colliding against an obstacle, comprising a plurality of impact members of high elasticity for tension; and means for connecting said members to the moving body so that the members, during a collision with an obstacle, are subjected to a strong longitudinal stretching, whereby the kinetic energy of the moving body is absorbed.

19. A shock absorbing device, especially for motor vehicles, comprising a plurality of substantially rod-shaped solid caoutchouc bodies arranged parallel to each other in different vertical planes; and means for holding said rods and connecting them to the vehicle.

20. A shock absorbing device, especially for motor vehicles, comprising a rod-shaped solid caoutchouc body; clamp-like holding means for said body; arms connected to said clamp-like holding means; a spring connection between said arms; bearers for connecting said arms to the vehicle; pivotal connections between said arms and said bearers; and means for adjusting said bearers in different angular positions relatively to a horizontal plane.

21. A shock absorbing device, especially for motor vehicles, comprising a plurality of substantially rod-shaped solid caoutchouc bodies arranged parallel to each other; clamp-like holding means for said rods; arms rigidly connected to said clamp-like holding means; bearers for connecting said arms to the vehicle; corresponding arms for said different rods and being pivoted to a common pin; and means for coupling said corresponding arms in certain positions of their movement.

KARL SCHLEIFF.